United States Patent
Tenno

(10) Patent No.: US 9,846,834 B2
(45) Date of Patent: Dec. 19, 2017

(54) ANTENNA DEVICE AND WIRELESS COMMUNICATION DEVICE

(71) Applicant: Murata Manufacturing Co., Ltd., Nagaokakyo-shi, Kyoto-fu (JP)

(72) Inventor: Nobuyuki Tenno, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 54 days.

(21) Appl. No.: 14/820,684

(22) Filed: Aug. 7, 2015

(65) Prior Publication Data
US 2015/0349423 A1 Dec. 3, 2015

Related U.S. Application Data

(63) Continuation of application No. PCT/JP2015/053733, filed on Feb. 12, 2015.

(30) Foreign Application Priority Data

Feb. 14, 2014 (JP) ................. 2014-026019

(51) Int. Cl.
*H01Q 21/00* (2006.01)
*G06K 19/077* (2006.01)
(Continued)

(52) U.S. Cl.
CPC ... *G06K 19/07784* (2013.01); *G06K 7/10336* (2013.01); *G06K 7/10356* (2013.01);
(Continued)

(58) Field of Classification Search
CPC ........... H01Q 7/00; H01Q 7/06; H01Q 1/2208
See application file for complete search history.

(56) References Cited

U.S. PATENT DOCUMENTS 6,367,143 B1 * 4/2002 Sugimura ........... H01F 17/0033
29/602.1
2007/0158438 A1 * 7/2007 Fukuda .............. G06K 19/0723
235/492
(Continued)

FOREIGN PATENT DOCUMENTS

JP      2002-063557 A    2/2002
JP      2003-187195 A    7/2003
(Continued)

OTHER PUBLICATIONS

Official Communication issued in International Patent Application No. PCT/JP2015/053733, dated Mar. 31, 2015.
(Continued)

*Primary Examiner* — Dieu H Duong
(74) *Attorney, Agent, or Firm* — Keating & Bennett, LLP

(57) ABSTRACT

An antenna device includes a first coil and a second coil whose winding axes are parallel or substantially parallel, are disposed so as to be insulated from each other, and that magnetically couple with each other; a first capacitance that is connected in parallel to the first coil and defines a first resonance circuit with the first coil; a second capacitance that is connected in parallel to the second coil and defines a second resonance circuit with the second coil; a third capacitance connected between at least one set of ends of the first coil and the second coil; and a power supply terminal connected to the first coil.

19 Claims, 13 Drawing Sheets

(51) Int. Cl.
*H01Q 7/06* (2006.01)
*H01Q 1/22* (2006.01)
*H01Q 7/00* (2006.01)
*G06K 7/10* (2006.01)

(52) U.S. Cl.
CPC ............ *H01Q 1/2208* (2013.01); *H01Q 7/00* (2013.01); *H01Q 7/06* (2013.01); *G06K 7/10386* (2013.01); *G06K 19/07771* (2013.01)

(56) References Cited

U.S. PATENT DOCUMENTS

| | | | |
|---|---|---|---|
| 2009/0040734 A1* | 2/2009 | Ochi | G06K 19/0723 361/737 |
| 2009/0166434 A1 | 7/2009 | Taniguchi et al. | |
| 2012/0092222 A1* | 4/2012 | Kato | G08B 13/00 343/742 |
| 2012/0262357 A1 | 10/2012 | Kato et al. | |
| 2014/0198011 A1 | 7/2014 | Tsubaki et al. | |
| 2014/0203992 A1 | 7/2014 | Nakano et al. | |

FOREIGN PATENT DOCUMENTS

| | | |
|---|---|---|
| JP | 2003-331238 A | 11/2003 |
| JP | 2010-109806 A | 5/2010 |
| JP | 2011-097657 A | 5/2011 |
| JP | 2012-60372 A | 3/2012 |
| JP | 2013-172241 A | 9/2013 |
| JP | 2013-247554 A | 12/2013 |
| WO | 2009/081683 A1 | 7/2009 |
| WO | 2013/179866 A1 | 12/2013 |
| WO | 2014/003164 A1 | 1/2014 |

OTHER PUBLICATIONS

Official Communication issued in corresponding Japanese Patent Application No. 2015-203368, dated Jun. 28, 2016.

* cited by examiner frequency (10MHz to 17MHz)

frequency [MHz]

frequency (10MHz to 17MHz)

ANTENNA DEVICE AND WIRELESS COMMUNICATION DEVICE

BACKGROUND OF THE INVENTION

1. Field of the Invention

The present invention relates to antenna devices and wireless communication devices that include the antenna devices, and particularly relates to antenna devices and wireless communication devices preferably for use in HF band communication systems.

2. Description of the Related Art

RFID (Radio Frequency Identification) systems in which a reader/writer and an RFID tag are caused to carry out non-contact communication and information is transmitted between the reader/writer and the RFID tag are known. Both the reader/writer and the RFID tag have an antenna device for sending and receiving wireless signals. If the RFID system is an HF band RFID system that uses a 13.56 MHz band, for example, the antenna device in the RFID tag and the antenna device in the reader/writer couple primarily using an induction field, and then send and receive predetermined information.

RFID systems are recently being introduced into communication terminal devices such as cellular phones, and such communication terminal devices are sometimes used as reader/writers, RFID tags, and so on. Japanese Unexamined Patent Application Publication No. 2002-63557 discloses a ferrite chip antenna that is able to be used in such an RFID system.

With miniaturization, higher levels of integration, and so on in communication terminal devices, small electronic devices, and the like used in communication systems such as the aforementioned RFID system, there is demand for the miniaturization of antenna devices as well. However, the radiation capabilities of an antenna device generally decrease due to such miniaturization, which tends to narrow the required communication band width. It is therefore desirable for the characteristics of the antenna device itself to have wide band characteristics and be small, or have wide band characteristics relative to the small size.

Meanwhile, when an antenna device is incorporated into a limited space along with a circuit board, structural members, and so on, the antenna device is often near ground electrodes, metal members, and the like; being near such conductors alters the inductance of the antenna, causing a resonant frequency to deviate from an expected value (a desired value). It is thus desirable for the resonance characteristics of the antenna device to span a wide band so that the desired effect can be obtained even if the resonant frequency of the antenna device changes.

Furthermore, when an antenna device is used in both a reader/writer mode and a card emulation mode, the impedance of a power supply circuit in an RFIC connected to the antenna device will vary depending on the mode, even if the antenna device is in a stable surrounding environment. It is thus desirable for the resonance characteristics of the antenna device to have a wide band so that predetermined communication performance can be achieved even if the impedance of the power supply circuit changes.

Broadening the band based on the various aforementioned requirements is particularly important in narrow-band communication systems such as NFC (Near Field Communication) systems, where the band width ratio is several percent.

SUMMARY OF THE INVENTION

Accordingly, preferred embodiments of the present invention provide an antenna device, and a wireless communication device including the same, that is small in size and achieves a wide band width.

An antenna device according to a preferred embodiment of the present invention includes a first coil and a second coil whose winding axes are parallel or substantially parallel, are disposed so as to be insulated from each other, and that magnetically couple with each other; a first capacitance that is connected in parallel to the first coil and defines a first resonance circuit with the first coil; a second capacitance that is connected in parallel to the second coil and defines a second resonance circuit with the second coil; a third capacitance connected between at least one set of ends of the first coil and the second coil; and a first power supply terminal connected to the first coil.

According to this configuration, the first resonance circuit including the first coil and the first capacitance and the second resonance circuit including the second coil and the second capacitance define a coupled resonance system coupled with the third capacitance interposed therebetween, and thus the antenna device is able to be used as an antenna device that matches at two frequencies or in a frequency band that spans two frequencies, without increasing the size of the device.

It is preferable that the antenna device further include a multilayer body including a plurality of base material layers including a magnetic material layer, with the first coil and the second coil being provided in or on the multilayer body and wound so that the magnetic material layer is positioned within the first coil and the second coil. According to this configuration, coils having a predetermined inductance are able to be provided within a small space, which enables miniaturization.

It is preferable that the first coil and the second coil include conductor patterns along a surface perpendicular or substantially perpendicular to a lamination direction of the multilayer body, and are wound in a flat double helix shape so that the winding axes are oriented in a direction perpendicular or substantially perpendicular to the lamination direction of the multilayer body and the magnetic material layer is positioned within the helixes. According to this configuration, two coils are able to be provided in a small space and the conductor pattern need only be provided in two layers, achieving miniaturization and a reduction in costs.

It is preferable that a chip component including at least one of the first capacitance, the second capacitance, and the third capacitance be mounted on an upper surface of the multilayer body. According to this configuration, the amount of surface area required to mount a wireless communication device onto a board is significantly reduced.

It is preferable that a resonant frequency of the first resonance circuit is the same or substantially the same as a resonant frequency of the second resonance circuit, the first resonance circuit and the second resonance circuit capacitively couple through the third capacitance, and return loss characteristics as viewed from the power supply terminals have two nearby resonance points. According to this configuration, the antenna device is able to be used as an antenna device that matches at two nearby frequencies or in a frequency band that spans two nearby frequencies.

In order to selectively connect to two power supply circuits, it is preferable that the antenna device further include a second power supply terminal connected to the second coil, and that return loss characteristics as viewed from the first power supply terminal be different from return loss characteristics as viewed from the second power supply terminal. According to this configuration, it is possible to handle cases where the power supply circuits have different impedances.

The antenna device may further include a planar conductor that is disposed nearby the first coil and the second coil and that produces an electromagnetic field by electromagnetically coupling with the first coil and the second coil. According to this configuration, the planar conductor is able to be used as a radiating element, and thus a required radiation efficiency is ensured even when the antenna device is small.

The antenna device may further include a coil conductor, including a larger coil opening than the first coil and the second coil, that is disposed nearby the first coil and the second coil and that produces an electromagnetic field by electromagnetically coupling with the first coil and the second coil. According to this configuration, the coil conductor is able to be used as a radiating element, and thus the radiation efficiency is significantly improved.

A wireless communication device according to a preferred embodiment of the present invention includes an antenna device having any of the aforementioned configurations, and a housing that contains the antenna device therewithin. According to this configuration, a small-sized wireless communication device including a small-sized antenna device is provided.

According to various preferred embodiments of the present invention, the first resonance circuit including the first coil and the first capacitance and the second resonance circuit including the second coil and the second capacitance define a coupled resonance system coupled with the third capacitance interposed therebetween, and thus the antenna device is able to be used as an antenna device that matches at two frequencies or in a frequency band that spans two frequencies, without increasing the size of the device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
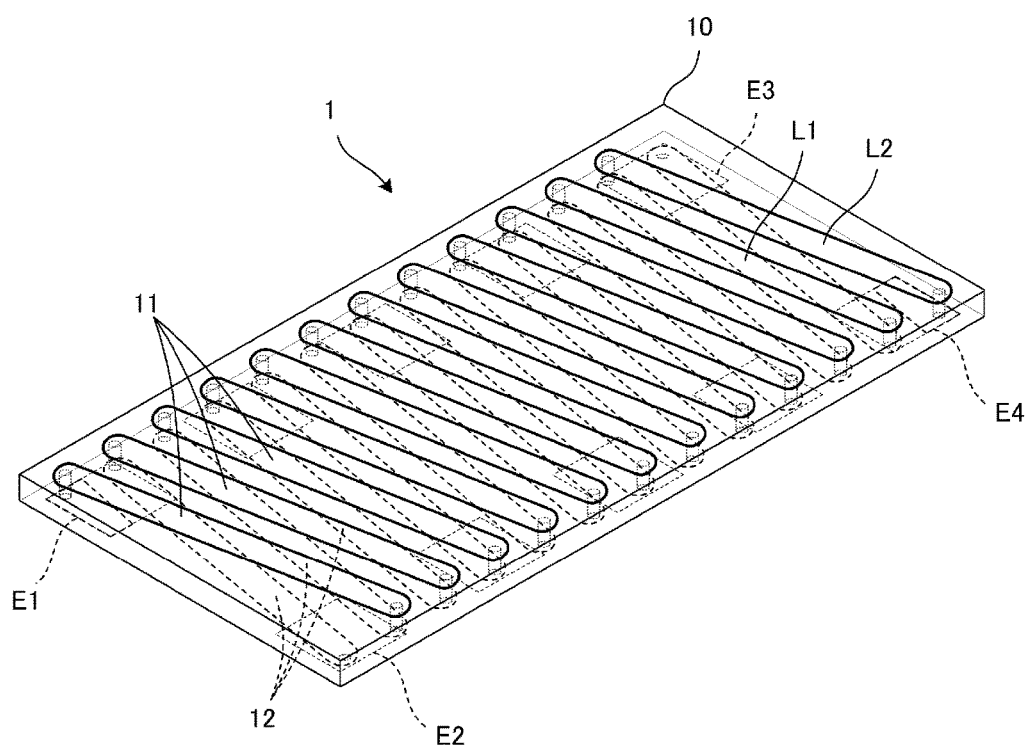
FIG. 1A is a perspective view illustrating a coil antenna 1 that is one constituent element in an antenna device according to a first preferred embodiment of the present invention.

Several preferred embodiments of the present invention will be described hereinafter with reference to the drawings, using several specific examples. Corresponding elements in the drawings are given the same reference numerals. The preferred embodiments described herein are merely examples, and that configurations described in different preferred embodiments can replace each other or be combined as well.

First Preferred Embodiment

Figure 1B:
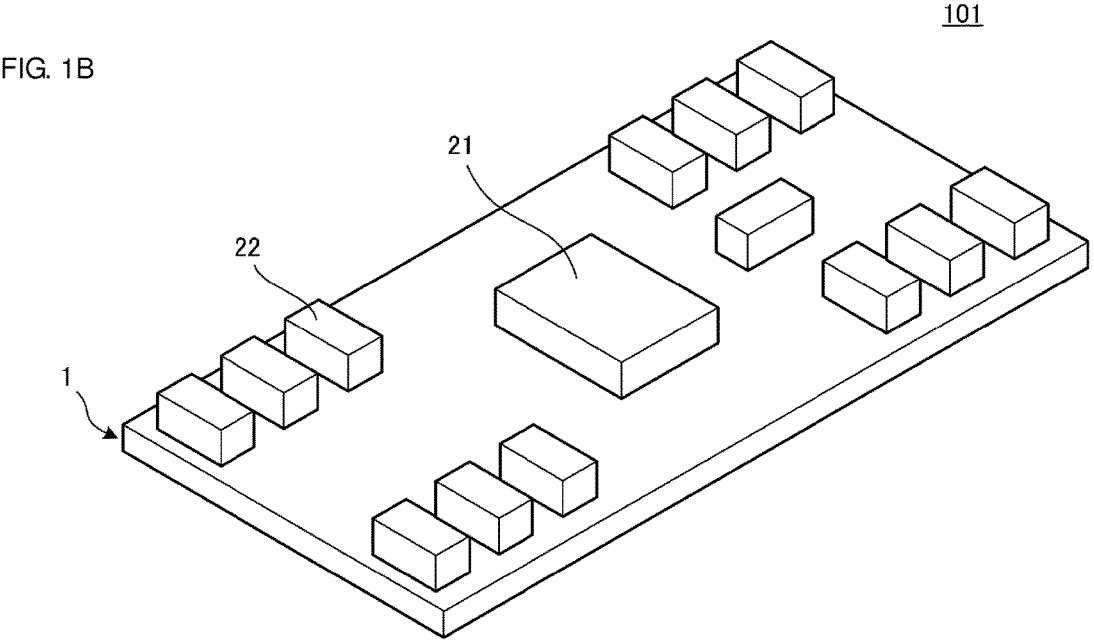
FIG. 1B is a perspective view illustrating an antenna device 101 formed by mounting a plurality of chip components on an upper area of the coil antenna 1.

FIG. 1A is a perspective view illustrating a coil antenna 1 that is one constituent element in an antenna device according to a first preferred embodiment of the present invention. FIG. 1B is a perspective view illustrating an antenna device 101 formed by mounting a plurality of chip components on an upper area of the coil antenna 1.

The coil antenna 1 illustrated in FIG. 1A is constituted by a multilayer body 10 preferably formed by laminating a plurality of insulators in which conductor patterns are formed. FIGS. 1A and 1B depict the interior of the multilayer body in a transparent manner.

An upper conductor pattern 11, a lower conductor pattern 12, and an interlayer connecting conductor that defines an interlayer connection between the upper conductor pattern 11 and the lower conductor pattern 12 are provided in the multilayer body 10, thus defining a first coil L1 and a second coil L2 that each include a plurality of turns.

The first coil and the second coil have winding axes facing in directions perpendicular or substantially perpendicular to a lamination direction of the multilayer body, are flat, and are wound as a double helix, in which each helix has an equal diameter or substantially equal diameter. According to this structure, the first coil and the second coil are disposed with their winding axes parallel or substantially parallel, are insulated from each other, and are magnetically coupled to each other. By winding the first coil and the second coil as a double helix, the coil antenna is able to have a large size within the multilayer body, and it is also difficult for a closed magnetic circuit of only magnetic bodies to be produced, which improves the antenna characteristics.

As will be described later, an insulative base material layer is further laminated to a top surface of the base material layer in which the upper conductor pattern 11 is provided. A plurality of chip components are mounted on a surface of this insulative base material layer, as illustrated in FIG. 1B.

Figure 2:
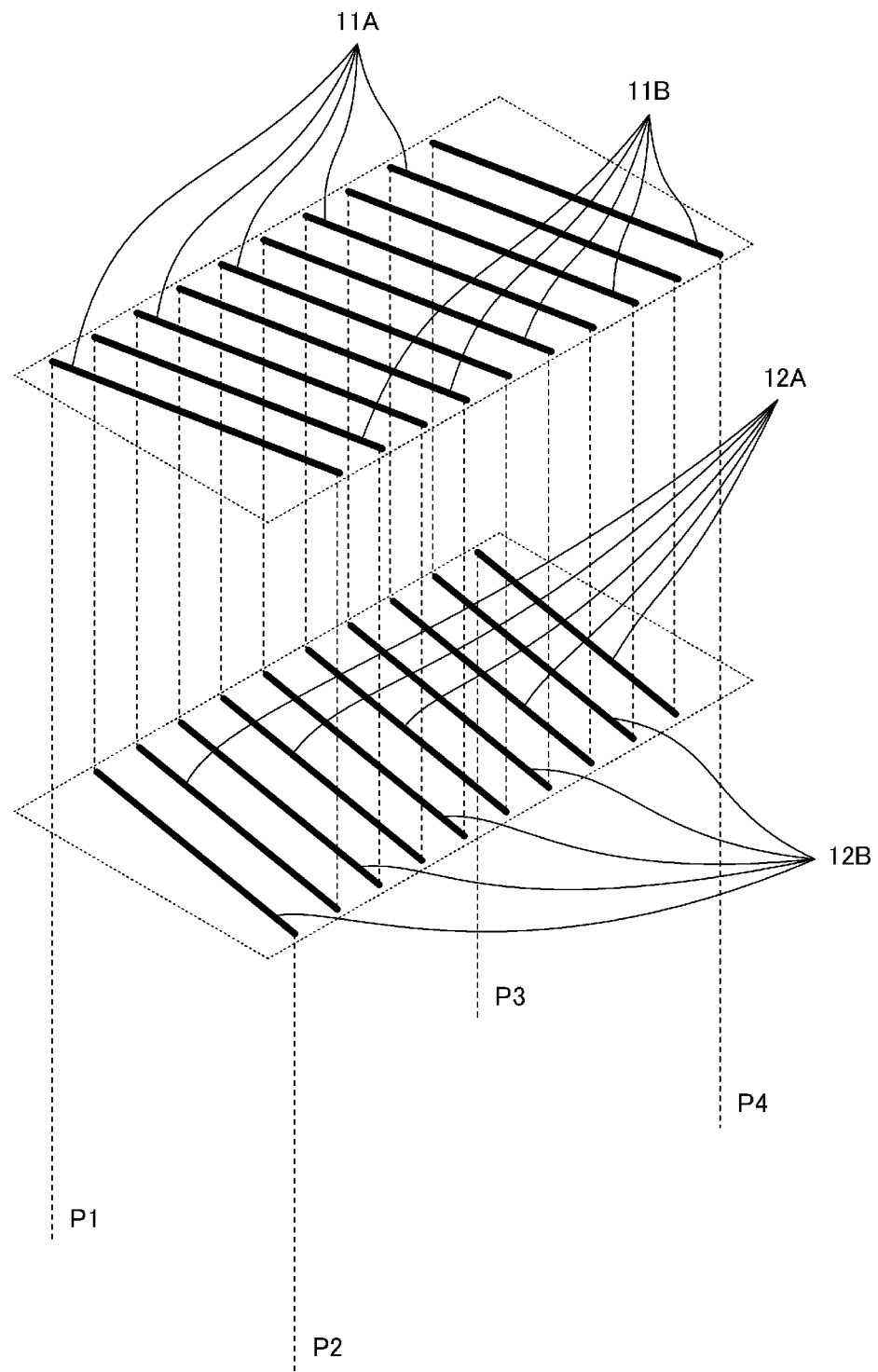
FIG. 2 is an exploded perspective view illustrating the overall shape of a first coil and a second coil.

FIG. 2 is an exploded perspective view illustrating the overall shape of the first coil and second coil. The multilayer body 10 illustrated in FIGS. 1A and 1B includes a plurality of base material layers, with upper conductor patterns 11A and 11B provided on a predetermined upper base material layer and lower conductor patterns 12A and 12B provided on a predetermined lower base material layer. Furthermore, an interlayer connecting conductor that connects the upper conductor pattern 11A and the lower conductor pattern 12A is provided, and the first coil is defined by this interlayer connecting conductor, the upper conductor pattern 11A, and the lower conductor pattern 12A. Likewise, an interlayer connecting conductor that connects the upper conductor pattern 11B and the lower conductor pattern 12B is provided, and the second coil is defined by this interlayer connecting conductor, the upper conductor pattern 11B, and the lower conductor pattern 12B. A first end of the first coil corresponds to a port P1, and a second end corresponds to a port P3. A first end of the second coil corresponds to a port P2, and a second end corresponds to a port P4.

Figure 3:
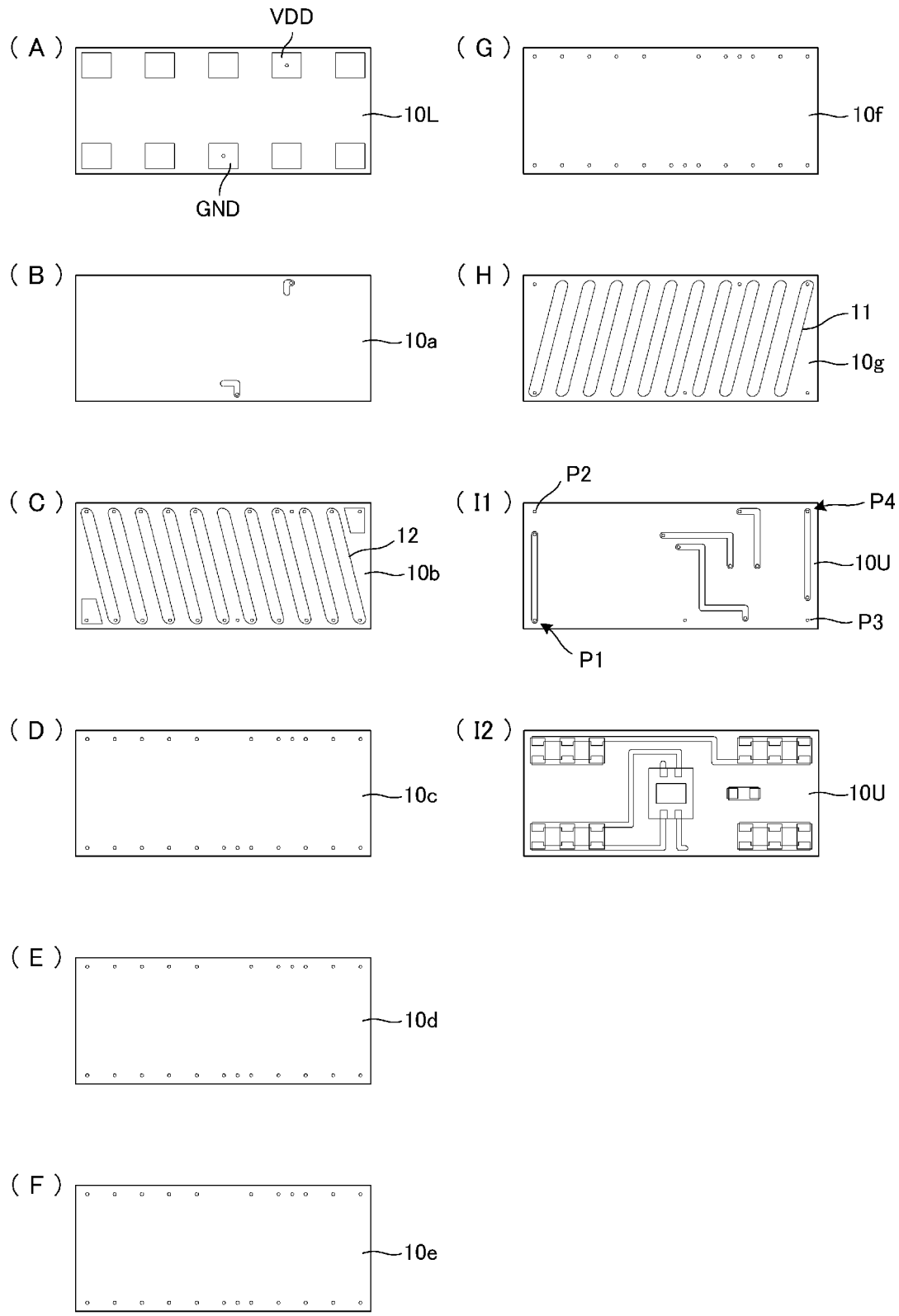
FIG. 3 is a plan view illustrating each of base material layers of the coil antenna 1.
Figure 4:
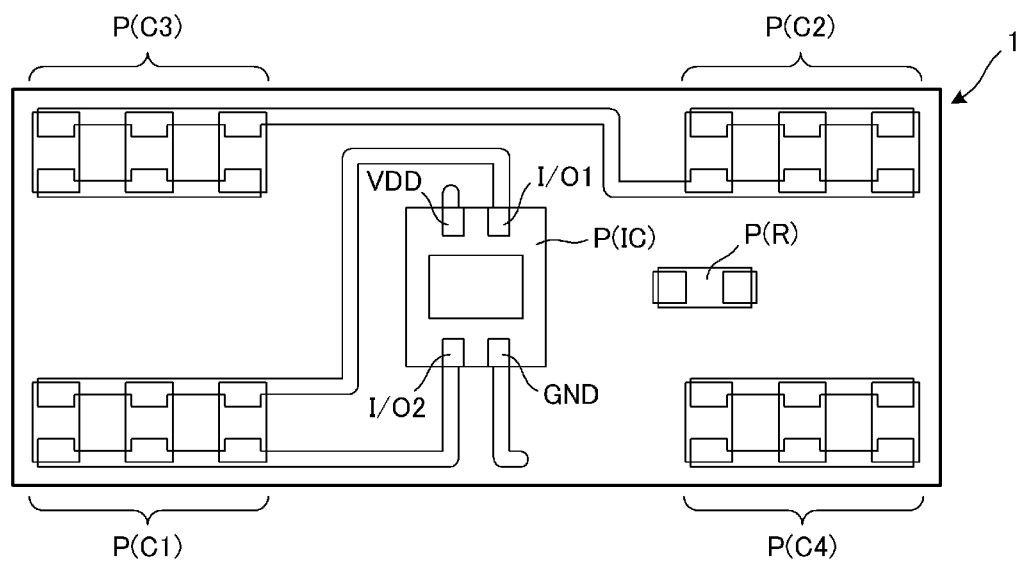
FIG. 4 is a plan view illustrating a chip component mounting surface side of the coil antenna 1.

FIG. 3 is a plan view illustrating each of base material layers of the coil antenna 1. FIG. 4 is a plan view illustrating a chip component mounting surface side of the coil antenna 1.

In FIGS. 3, (A) to (I1) are plan views of respective base material layers of the multilayer body 10 that constitutes the coil antenna 1, and are all bottom views. (I2) in FIG. 3 is a top view of an uppermost layer 10U. The multilayer body 10 is constituted by base material layers 10L, 10a to 10g, and 10U. A plurality of terminals including a ground terminal GND and a power source terminal VDD are provided on the lowermost layer 10L. These terminals are terminals to mount to a circuit board. The base material layers 10b to 10f are defined by magnetic ferrite sheets, and the other base material layers 10L, 10a, 10g, and 10U are defined by non-magnetic ferrite sheets.

The lower conductor pattern 12 is provided on the base material layer 10b, and the upper conductor pattern 11 is provided on the base material layer 10g. Terminals to mount the plurality of chip components are provided on an upper surface of the uppermost layer 10U.

In FIG. 4, a position P (IC) indicates a mounting position of an RFIC, and a position P (R) indicates a mounting position of a chip resistance. A position P (C1) indicates a mounting position of a chip capacitor for a capacitance C1, a position P (C2) indicates a mounting position of a chip capacitor for a capacitance C2, a position P (C3) indicates a mounting position of a chip capacitor for a capacitance C3, and a position P (C4) indicates a mounting position of a chip capacitor for a capacitance C4. By mounting a maximum of three chip capacitors at each of these chip capacitor mounting positions, the chip capacitors are connected in parallel. By enabling a plurality of chip capacitors to be connected in parallel in this manner, the resonant frequencies and degrees of capacitive coupling of a first resonance circuit and a second resonance circuit (mentioned later) are able to be set as appropriate in accordance with the characteristics of the RFIC, the application, and so on.

Figure 5A:
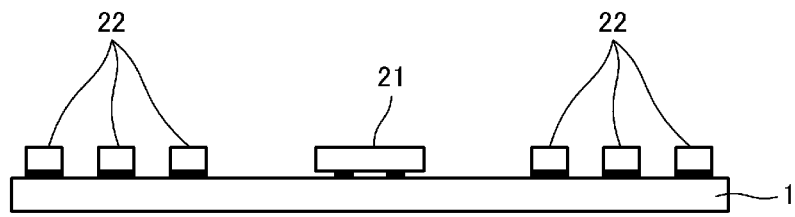
FIG. 5A is a front view illustrating the antenna device 101.
Figure 5B:
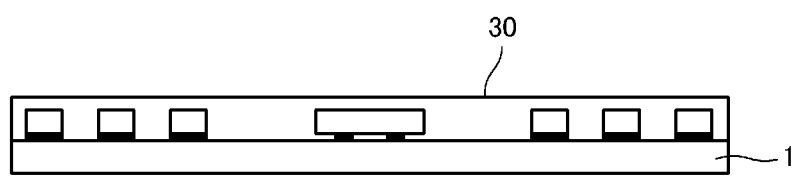
FIG. 5B is a cross-sectional view illustrating an antenna device having a configuration partially different from that of the antenna device 101.

FIG. 5A is a front view illustrating the antenna device 101. FIG. 5B is a cross-sectional view illustrating an antenna device having a configuration partially different from that of the antenna device 101. In the antenna device 101, an RFIC chip 21 and chip capacitors 22 are mounted on a surface of the coil antenna 1.

FIG. 5B illustrates an example in which an upper area of the coil antenna 1 preferably is sealed with a sealing resin 30 after a plurality of chip components have been mounted on a surface of the coil antenna 1. This configuration increases resistance to impacts and external forces, and increases environmental resistance by suppressing moisture and the like from penetrating.

Figure 6A:
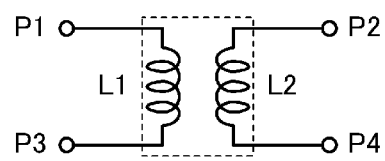
FIG. 6A is an equivalent circuit diagram illustrating the coil antenna 1.
Figure 6B:
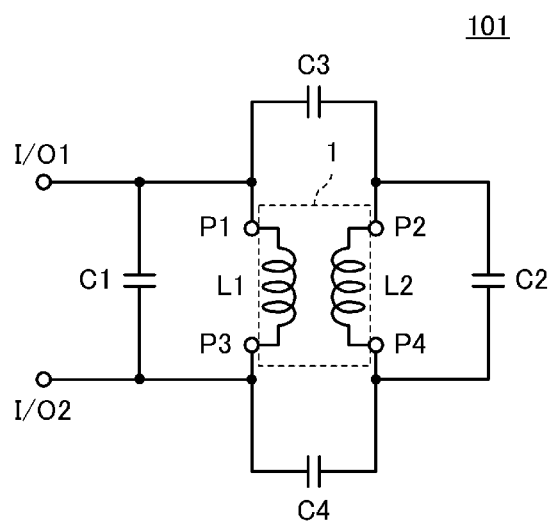
FIG. 6B is an equivalent circuit diagram illustrating the antenna device 101.

FIG. 6A is an equivalent circuit diagram illustrating the coil antenna 1, and FIG. 6B is an equivalent circuit diagram illustrating the antenna device 101. The first coil L1 and the second coil L2 are wound in a double helix, and thus magnetically couple (M coupling) with each other.

As illustrated in FIG. 6B, the first capacitance C1 is connected in parallel to the first coil L1 of the coil antenna 1, and the second capacitance C2 is connected in parallel to the second coil L2 of the coil antenna 1. Furthermore, the third capacitance C3 is connected between the port P1 corresponding to the first end of the first coil L1 and the port P2 corresponding to the first end of the second coil L2. Likewise, the fourth capacitance C4 is connected between the port P3 corresponding to the second end of the first coil L1 and the port P4 corresponding to the second end of the second coil L2.

The first resonance circuit is defined by the parallel circuit of the first coil L1 and the first capacitance C1, and the second resonance circuit is defined by the parallel circuit of the second coil L2 and the second capacitance C2. The first resonance circuit and the second resonance circuit capacitively couple (C coupling) with the third capacitance C3 and the fourth capacitance C4 interposed therebetween. A coupled resonance system in which two LC resonance circuits are coupled is provided as a result.

A power supply circuit of the RFIC is connected to input/output ports I/O1 and I/O2 that define and function as power supply terminals. Note that an impedance matching circuit may be provided between the input/output ports I/O1 and I/O2 and the first resonance circuit. For example, a capacitance may be connected in series between the input/output ports I/O1 and I/O2 and the first resonance circuit.

Figure 7A:
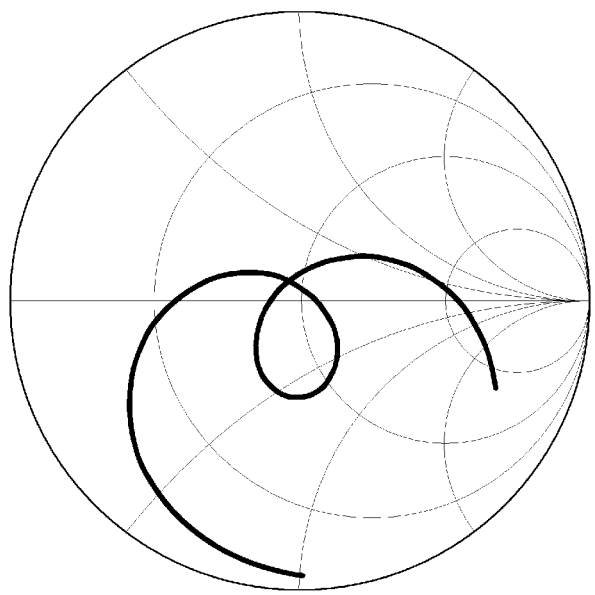
FIG. 7A is a diagram expressing, on a Smith chart, a trajectory in a sweep of frequencies relative to a reflectance coefficient as viewed from input/output ports I/O1 and I/O2 illustrated in FIG. 6B.
Figure 7B:
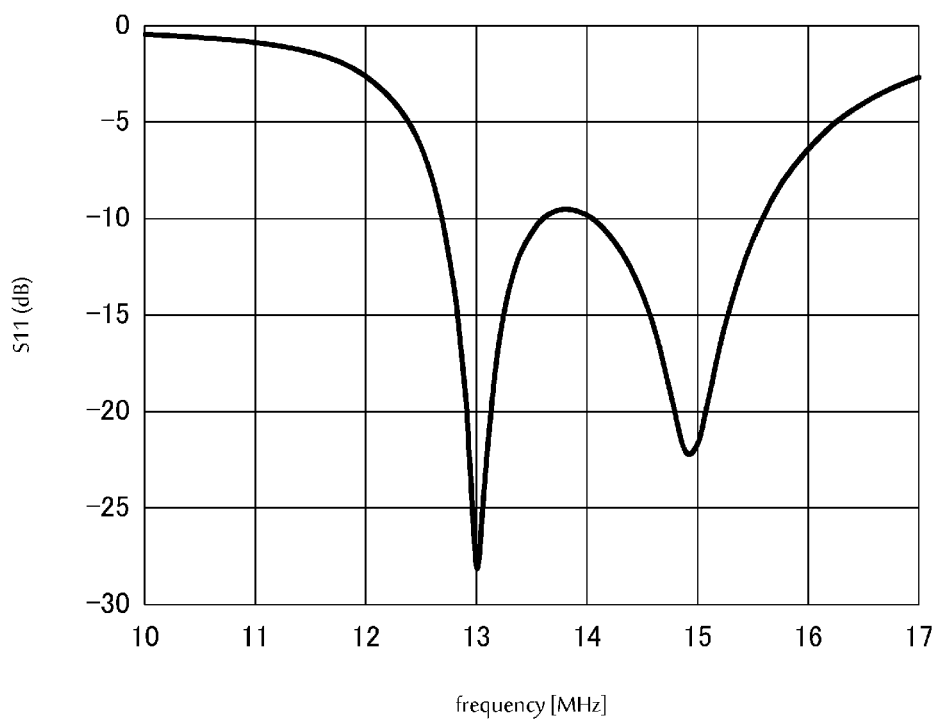
FIG. 7B is a chart illustrating return loss frequency characteristics as viewed from the input/output ports I/O1 and I/O2.

FIG. 7A is a diagram expressing, on a Smith chart, a trajectory in a sweep of frequencies relative to a reflectance coefficient as viewed from the input/output ports I/O1 and I/O2 illustrated in FIG. 6B. FIG. 7B is a chart illustrating return loss frequency characteristics as viewed from the input/output ports I/O1 and I/O2.

The first resonance circuit and the second resonance circuit are coupled as a result of the M coupling between the first coil L1 and the second coil L2 and the C coupling between the capacitances C3 and C4. The coupling between the two resonance circuits produces an odd mode in which the two resonance circuits resonate at opposite phases and an even mode in which the two resonance circuits resonate at the same phase. The two poles indicated in FIG. 7B correspond to a frequency of the odd mode and a frequency of the even mode. A relationship between the levels of the two frequencies and the frequency interval thereof are determined by the strength of the M coupling, the strength of the C coupling, and a relationship between the magnitudes of those strengths. Although the M coupling between the first coil L1 and the second coil L2 is fixed by the structure of the coil antenna 1, the positions of the stated two poles are able to be designed using the capacitances of the capacitances C3 and C4.

The values of the respective elements illustrated in FIGS. 6A and 6B preferably are as follows, for example.

C1=520 pF
C2=670 pF
C3=C4=500 pF
L1=L2=0.2 μH
M=0.43

In the example illustrated in FIG. 7B, the return loss is no greater than −9 dB across a wide band from 12.7 MHz to 15.5 MHz. Wide band characteristics are thus obtained in this manner.

As illustrated in FIG. 1B and FIG. 5A, of the plurality of chip components mounted on the surface of the coil antenna 1, the largest chip component (the RFIC chip) 21 is disposed in a central area of the coil antenna 1. The mounting position of the chip component 21 is a centroid position of the antenna device 101 or the vicinity thereof. When mounting the antenna device 101 to a circuit board of a wireless communication device, a suction nozzle of a mounting device suctions an upper surface of the chip component 21, which has a broad surface area and corresponds to the stated centroid position. This makes it easy to handle the antenna device.

Although the capacitances C1, C2, C3, and C4 are described as chip components in the present preferred embodiment, these capacitances may be conductor patterns in the multilayer body 10. However, using chip components as in the present preferred embodiment makes it possible to provide comparatively large capacitances, and makes it easy to change the resonant frequencies of the resonance circuits.

In addition, in the present preferred embodiment, as illustrated in FIG. 3 and FIGS. 6A and 6B, the first coil L1 and the second coil L2 of the coil antenna 1 are connected so that the polarities thereof are additive, or in other words, are connected so that when, in FIGS. 6A and 6B, a current flows to the first coil L1 from the port P1, the port P2 of the second coil L2 is at a higher potential than the port P4; however, the polarities may be subtractive instead. However, additive polarity is favorable in the case of use in an antenna device as in the present preferred embodiment. If the sizes of the first coil L1 and the second coil L2 of the coil antenna 1 are increased so as to provide favorable antenna characteristics (magnetic flux radiation and collection), the coupling strength will increase due to an increase in the size of regions where the first coil L1 and the second coil L2 overlap within the multilayer body 10, and there are cases of the two resonant frequencies moving too far apart and stop bands arising within the frequency band. Using additive polarity as in the present preferred embodiment ensures that the two resonant frequencies are not too far apart, making it possible to provide a wider and more stable frequency band than in the case of subtractive polarity.

Although the resonant frequency of the first resonance circuit and the resonant frequency of the second resonance circuit preferably are different in the present preferred embodiment, it should be noted that these resonant frequencies may be the same. Even if the resonant frequencies are the same, having the odd mode and the even mode results in two resonant frequencies, and thus a wide frequency band is achieved.

Second Preferred Embodiment

Figure 8:
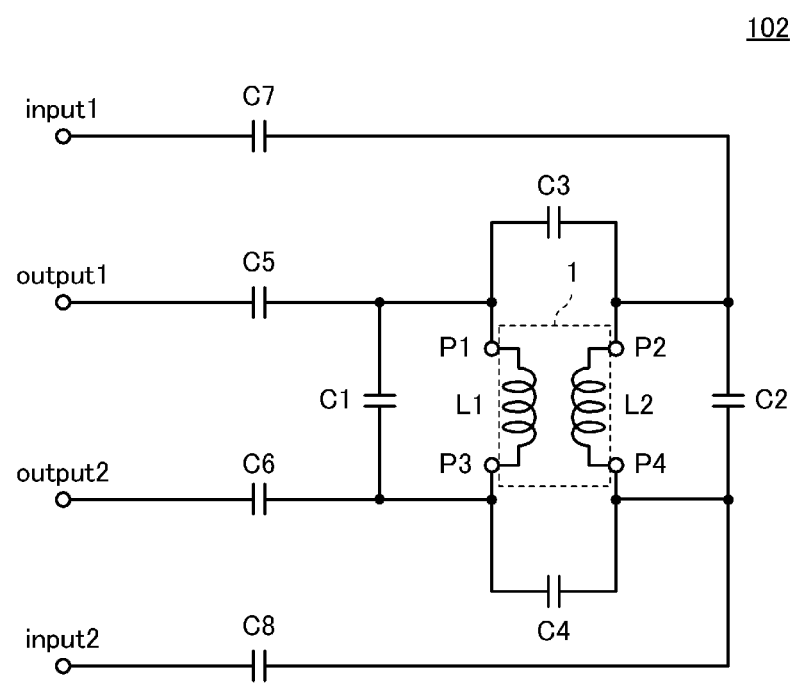
FIG. 8 is an equivalent circuit diagram illustrating an antenna device 102 according to a second preferred embodiment of the present invention.

FIG. 8 is an equivalent circuit diagram illustrating an antenna device 102 according to a second preferred embodiment of the present invention. The configurations of the coil antenna 1 and the capacitances C1, C2, C3, and C4 are the same as those described in the first preferred embodiment and illustrated in FIG. 6B. In the present preferred embodiment, first power supply terminals Output1 and Output2 are connected to the first resonance circuit defined by the parallel circuit of the first coil L1 and the first capacitance C1. Meanwhile, second power supply terminals Input1 and Input2 are connected to the second resonance circuit defined by the parallel circuit of the second coil L2 and the second capacitance C2.

In FIG. 8, impedance frequency characteristics of the antenna device as viewed from the first power supply terminals Output1 and Output2 differ from impedance frequency characteristics of the antenna device as viewed from the second power supply terminals Input1 and Input2. A communication circuit portion that operates in, for example, a reader/writer mode of the RFIC is connected to the first power supply terminals Output1 and Output2, whereas a communication circuit portion that operates in, for example, a card emulation mode of the RFIC is connected to the second power supply terminals Input1 and Input2.

Figure 9A:
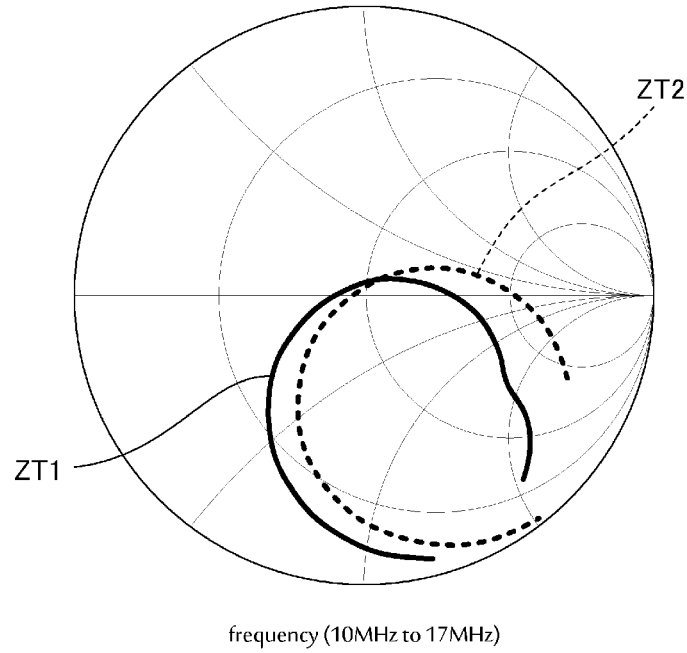
FIG. 9A is a diagram illustrating, on a Smith chart, trajectories in sweeps of frequencies relative to a reflectance coefficient as viewed from first power supply terminals Output1 and Output2 and relative to a reflectance coefficient as viewed from second power supply terminals Input1 and Input2 illustrated in FIG. 8.
Figure 9B:
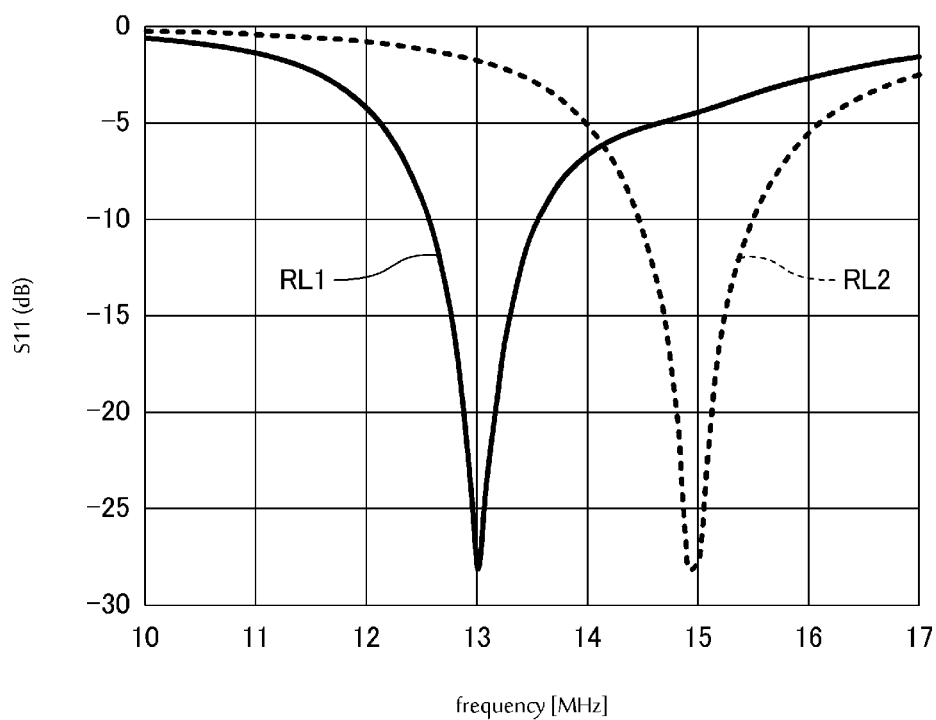
FIG. 9B is a chart illustrating return loss frequency characteristics as viewed from the first power supply terminals Output1 and Output2 and return loss frequency characteristics as viewed from the second power supply terminals Input1 and Input2.

FIG. 9A is a diagram illustrating, on a Smith chart, trajectories in sweeps of frequencies relative to a reflectance coefficient as viewed from the first power supply terminals Output1 and Output2 and relative to a reflectance coefficient as viewed from the second power supply terminals Input1 and Input2 illustrated in FIG. 8. FIG. 9B is a chart illustrating return loss frequency characteristics as viewed from the first power supply terminals Output1 and Output2 and return loss frequency characteristics as viewed from the second power supply terminals Input1 and Input2.

The first resonance circuit defined by the first coil L1 and the first capacitance C1 and the second resonance circuit defined by the second coil L2 and the second capacitance C2 illustrated in FIG. 8 couple due to the M coupling between the first coil L1 and the second coil L2 and the C coupling between the capacitances C3 and C4.

The values of the respective elements illustrated in FIG. 8 preferably are as follows, for example.

C1=530 pF
C2=430 pF
C3=C4=510 pF
L1=L2=0.2 μH
M=0.43

Because the resonant frequency of the first resonance circuit and the resonant frequency of the second resonance circuit differ, the reflectance coefficient frequency characteristics as viewed from the first power supply terminals Output1 and Output2 differ from the reflectance coefficient frequency characteristics as viewed from the second power supply terminals Input1 and Input2.

The RFIC connected to the antenna device 102 matches and terminates the second power supply terminals Input1 and Input2 in a state where the first power supply terminals Output1 and Output2 are used and matches and terminates the first power supply terminals Output1 and Output2 in a state where the second power supply terminals Input1 and Input2 are used. Note that the first power supply terminals Output1 and Output2 and the second power supply terminals need not necessarily be matched and terminated in the respective usage states.

Third Preferred Embodiment

Figure 10:
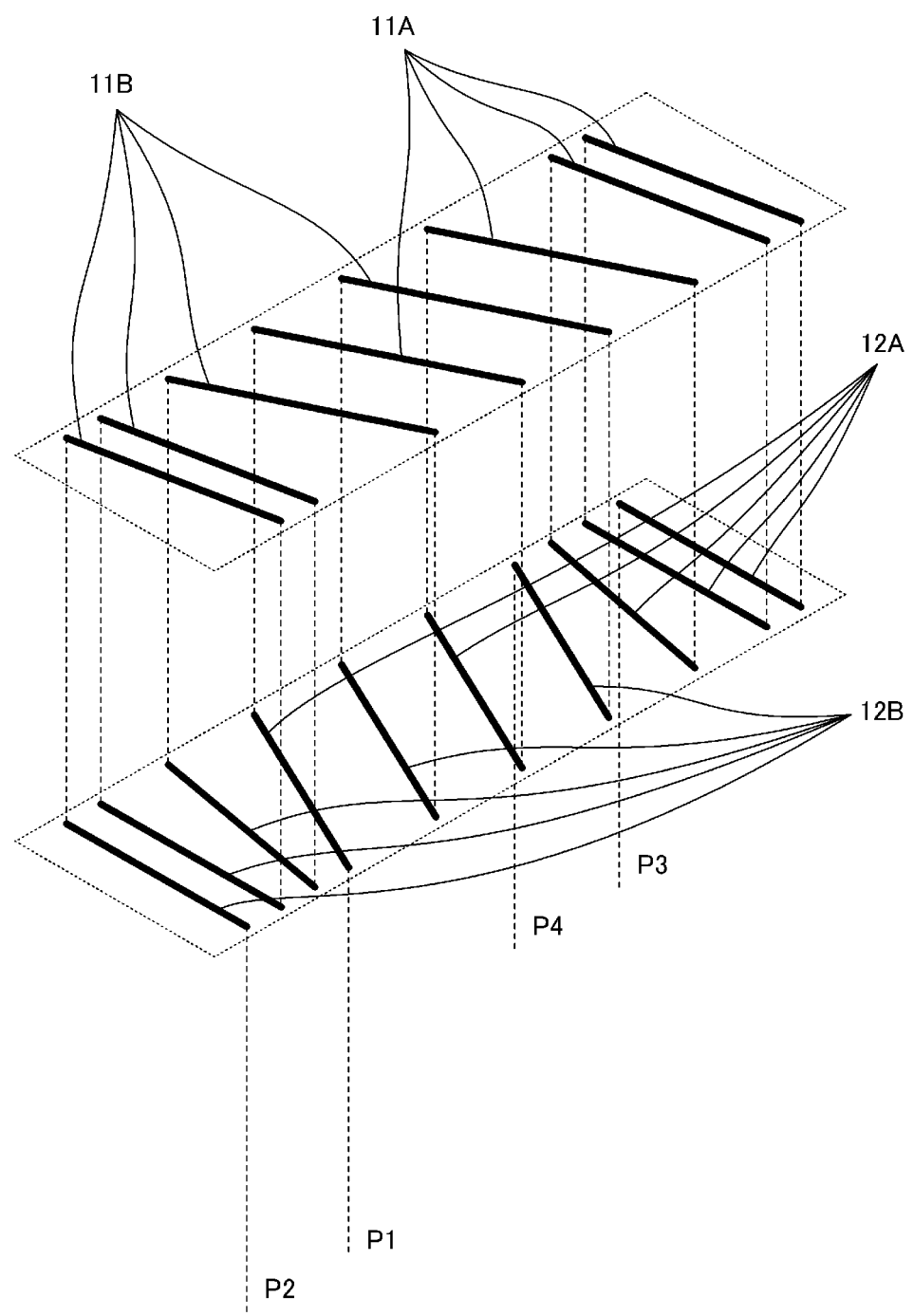
FIG. 10 is a perspective view illustrating the configuration of a coil antenna included in an antenna device according to a third preferred embodiment of the present invention.

FIG. 10 is a perspective view illustrating the configuration of a coil antenna included in an antenna device according to a third preferred embodiment of the present invention. The overall shapes of the first coil and the second coil are illustrated here in particular. The upper conductor patterns 11A and 11B are provided on a predetermined upper base material layer and the lower conductor patterns 12A and 12B are provided on a predetermined lower base material layer. Furthermore, an interlayer connecting conductor that connects the upper conductor pattern 11A and the lower conductor pattern 12A is provided, and the first coil is defined by this interlayer connecting conductor, the upper conductor pattern 11A, and the lower conductor pattern 12A. Likewise, an interlayer connecting conductor that connects the upper conductor pattern 11B and the lower conductor pattern 12B is provided, and the second coil is formed by this interlayer connecting conductor, the upper conductor pattern 11B, and the lower conductor pattern 12B. A first end of the first coil corresponds to the port P1, and a second end corresponds to the port P3. A first end of the second coil corresponds to the port P2, and a second end corresponds to the port P4.

In the example illustrated in FIG. 10, the first coil and the second coil overlap not across the entire area in which the first coil and the second coil are provided, but only partially, as viewed from above. In other words, the areas in which the first coil and the second coil are provided are skewed slightly in the direction in which the winding axes extend. A mutual inductance M may be set by adjusting the range in which the first coil and the second coil overlap in this manner.

Fourth Preferred Embodiment

Figure 11:
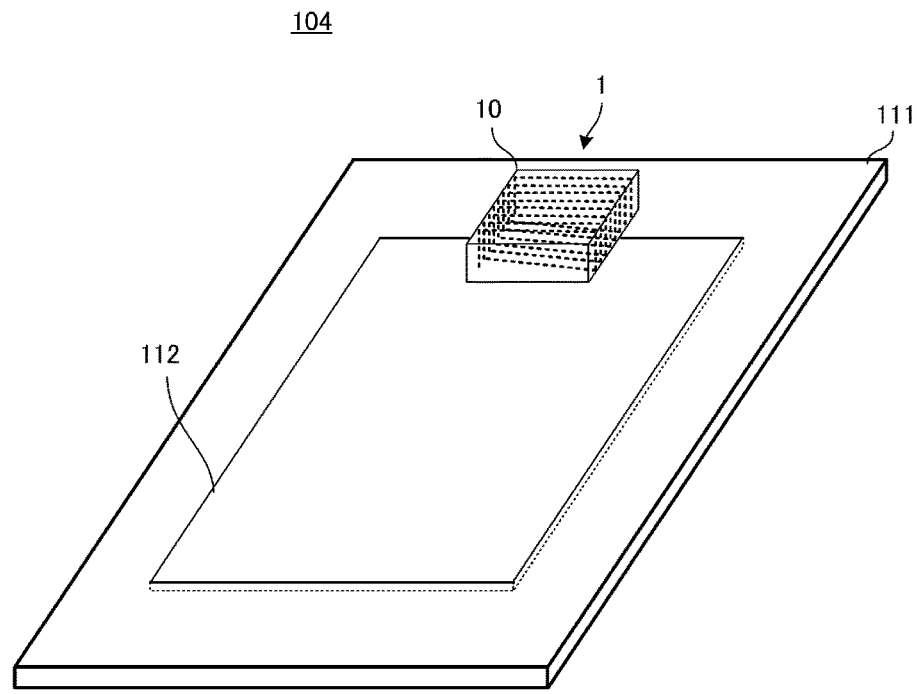
FIG. 11 is a perspective view illustrating an antenna device according to a fourth preferred embodiment of the present invention.

FIG. 11 is a perspective view illustrating an antenna device according to a fourth preferred embodiment of the present invention. This antenna device 104 includes the coil antenna 1 described in the aforementioned preferred embodiments. The coil antenna 1 has the same configuration as in the first preferred embodiment, but is illustrated in a simplified manner here. The RFIC, chip capacitors, and so on connected to the coil antenna 1 are not illustrated in FIG. 11. The antenna device 104 includes a base member 111 on which the coil antenna 1 is mounted and a planar conductor 112 provided on the base member 111. The base member 111 is a printed circuit board. The planar conductor 112 includes a metal film or a metal foil. The planar conductor 112 may be a ground conductor pattern of the printed circuit board. Furthermore, the planar conductor 112 may be provided on a surface of the base member 111, or may be provided within (in an inner layer of) the base member 111.

The coil antenna 1 and the planar conductor 112 are disposed in a positional relationship in which coil openings of the first coil and the second coil in the coil antenna 1 are adjacent to (nearby) an edge portion of the planar conductor 112. Meanwhile, the coil antenna 1 is disposed so that, when viewed from a normal direction of the planar conductor 112, the first coil and the second coil at least partially overlap with an end portion of the planar conductor 112.

Figure 12:
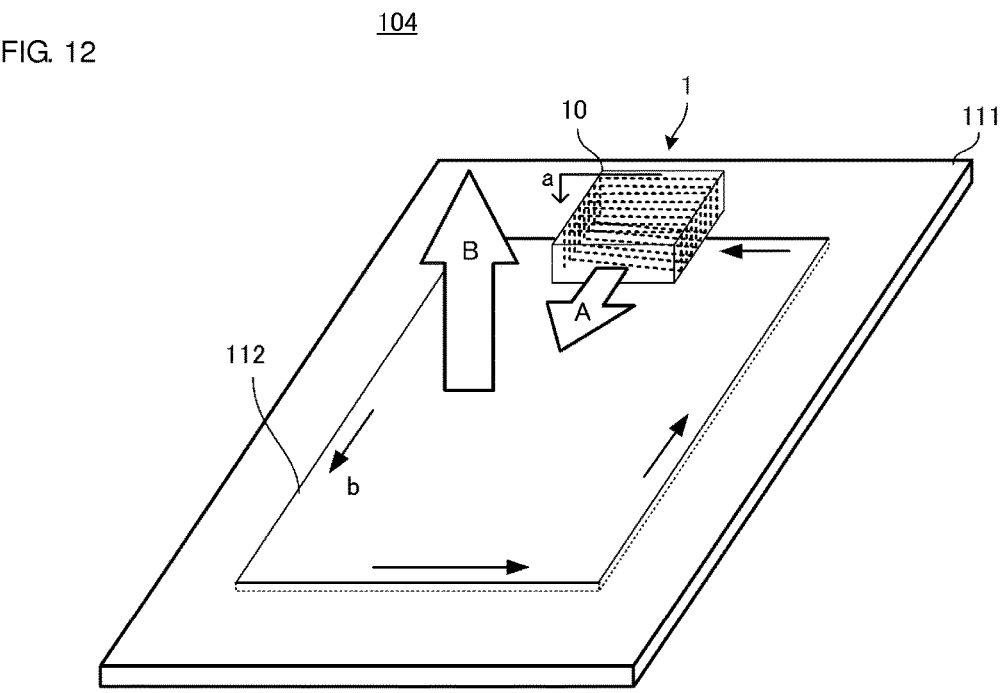
FIG. 12 is a perspective view illustrating the respective directions of currents flowing in a first coil and a second coil of a coil antenna 1, a current flowing in a planar conductor 112, a magnetic field produced by the coil antenna 1, and a magnetic field produced by the planar conductor 112.

FIG. 12 is a perspective view illustrating the respective directions of currents flowing in the first coil and the second coil of the coil antenna 1, a current flowing in the planar conductor 112, a magnetic field produced by the coil antenna 1, and a magnetic field produced by the planar conductor 112. When a current is supplied to the coil antenna 1 from a power supply circuit (not shown) and a current a flows to the coils, a current b is induced in the planar conductor 112 by an electromagnetic field produced by the current a. As a result, a magnetic field in the direction indicated by an arrow A is produced in the coil antenna 1, and a magnetic field in the direction indicated by an arrow B is produced in the planar conductor 112. The inverse phenomenon arises in the case where a magnetic flux enters from a communication partner side. In this manner, the planar conductor 112 is able to define and function as a booster antenna, and it is thus possible to produce a greater magnetic field than the magnetic field that able to be produced by the coil antenna 1 alone. Note that there does not necessarily have to be a part of the coil antenna 1 that overlaps with the planar conductor 112, and the coil antenna 1 may be disposed in the vicinity of the planar conductor so as to induce a current therein.

Fifth Preferred Embodiment

Figure 13A:
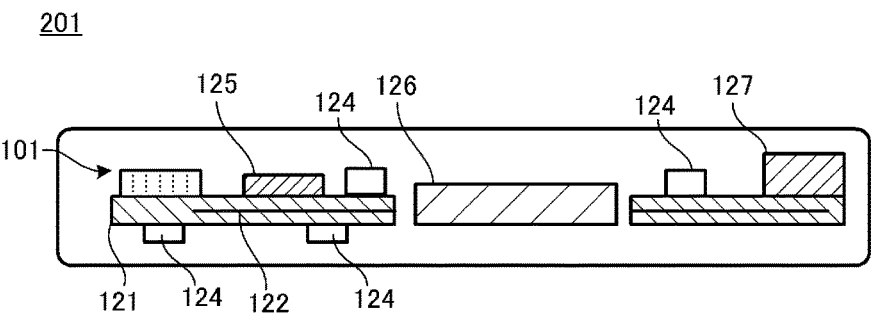
FIG. 13A is an overall cross-sectional view illustrating a wireless communication device 201 according to a fifth preferred embodiment of the present invention.
Figure 13B:
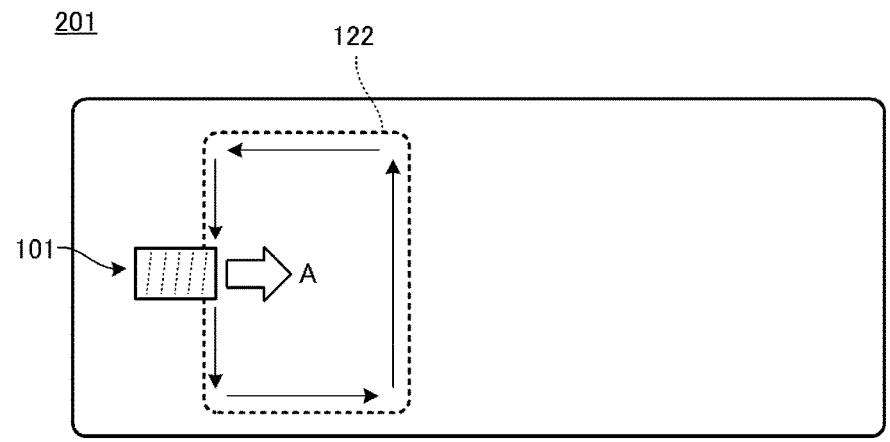
FIG. 13B is a see-through plan view illustrating the wireless communication device 201.

FIG. 13A is an overall cross-sectional view illustrating a wireless communication device 201 according to a fifth preferred embodiment of the present invention, and FIG. 13B is a see-through plan view illustrating the wireless communication device 201.

The wireless communication device 201 preferably is a cellular phone terminal, for example, and includes a base member 121 on which the antenna device 101 is mounted, and a battery 126. The base member 121 is a printed circuit board, and various types of chip components 124 and 125 as well as a UHF communication antenna 127 are further mounted on a mounting surface of the base member 121. The antenna device 101 has the same configuration as in the first preferred embodiment and the like.

A ground conductor pattern 122 is provided on an inner layer of the base member 121. The ground conductor pattern 122 functions in the same manner as the planar conductor 112 illustrated in FIG. 11, FIG. 12, and so on. Specifically, when a current flows to the coil antenna of the antenna device 101, an electromagnetic field produced by that current induces a current in the ground conductor pattern 122 in the direction indicated by the arrows in FIG. 13B. As a result, a magnetic field in the direction indicated by an arrow A is produced in the coil antenna, and a magnetic field in a vertical direction (a direction facing toward the viewer of FIG. 13B) is produced in the ground conductor pattern 122. The inverse phenomenon arises in the case where a magnetic flux enters from a reader/writer serving as a communication partner.

By using the ground conductor pattern 122 in this manner, it is not necessary to separately provide the planar conductor 112 illustrated in FIG. 11.

Note that the coil antenna, the RFIC, and the chip capacitors may be mounted on the base member 121 in the case where the RFIC, the chip capacitors, and so on are isolated from the coil antenna.

Sixth Preferred Embodiment

Figure 14A:
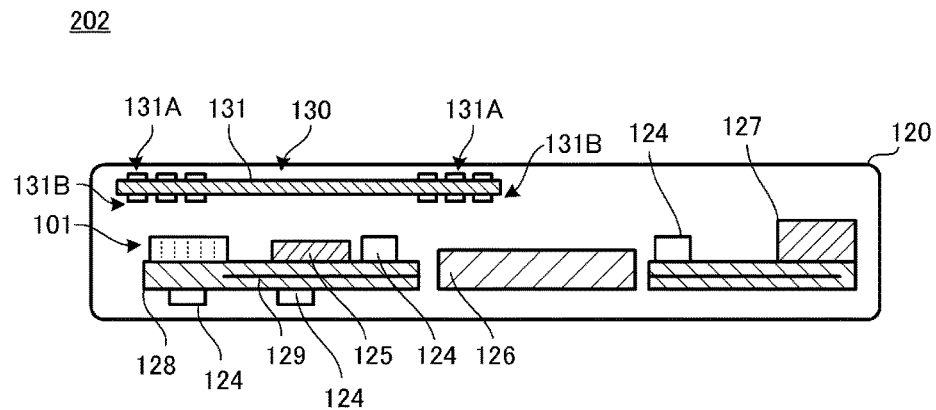
FIG. 14A is a cross-sectional view illustrating a wireless communication device 202 according to a sixth preferred embodiment of the present invention.
Figure 14B:
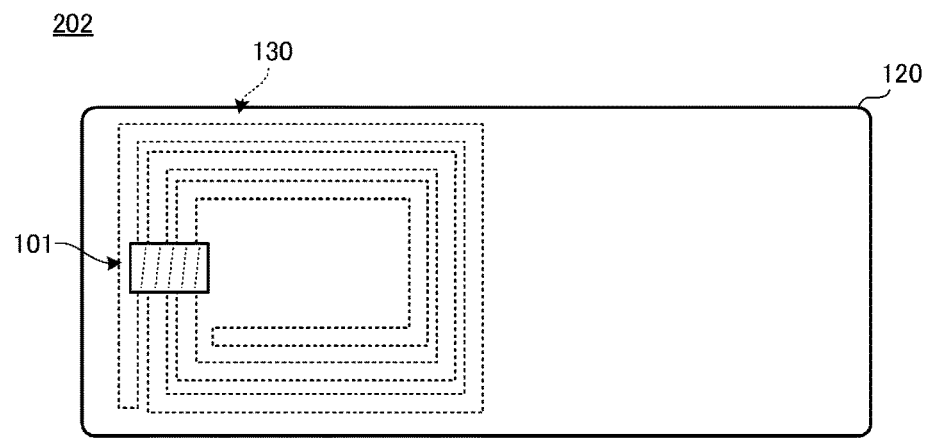
FIG. 14B is a see-through plan view illustrating the wireless communication device 202.

A sixth preferred embodiment of the present invention is a variation on the fifth preferred embodiment, and describes a configuration in which a coil-shaped booster antenna is included and the antenna device includes the coil-shaped booster antenna. FIG. 14A is a cross-sectional view illustrating a wireless communication device 202 according to the sixth preferred embodiment, and FIG. 14B is a see-through plan view illustrating the wireless communication device 202.

The wireless communication device 202 includes the same components as the various types of components illustrated in FIG. 13. Meanwhile, the wireless communication device 202 includes a housing 120 made of a resin, and a booster antenna 130 is provided along an inner side of the housing 120. The booster antenna 130 is attached to the inner side of the housing using an adhesive or the like, for example. The booster antenna 130 includes a coil conductor with a normal direction of a main surface of a thin plate-shaped base member 131 (a direction perpendicular to the main surface) as its winding axis. In the booster antenna 130, coil conductors 131A and 131B are provided on upper and lower surfaces of the thin plate-shaped base member 131 so as to oppose each other. The coil conductors 131A and 131B both preferably have rectangular or substantially rectangular spiral shapes, and a direction in which the upper-surface coil conductor 131A is wound from an outer periphery toward an inner periphery is the same as a direction in which the lower-surface coil conductor 131B from the inner periphery toward the outer periphery.

The antenna device 101 magnetically couples with the booster antenna 130. The booster antenna 130 is significantly larger than the coil antenna of the antenna device 101, and thus communication with an antenna of a communication partner is able to be carried out with ease. Accordingly, communication with the antenna of the communication partner is primarily handled by the booster antenna 130. The antenna device 101 is disposed nearby the coil conductor of the booster antenna 130 in a state where the winding axes of the coil conductors in the antenna device 101 are perpendicular or substantially perpendicular to the winding axes of the coil conductors in the booster antenna 130. Note that the booster antenna 130 may be formed by embedding coil conductors in a resin portion of the housing 120.

Figure 15A:
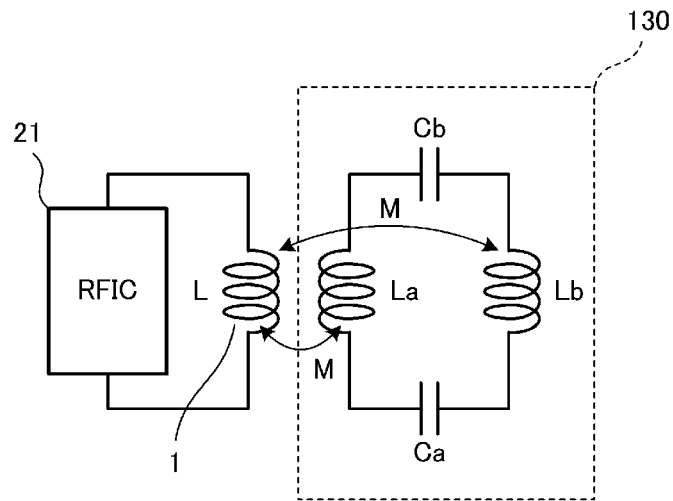
FIG. 15A and FIG. 15B are equivalent circuit diagrams illustrating circuits including a booster antenna 130 and a coil antenna 1.
Figure 15B:
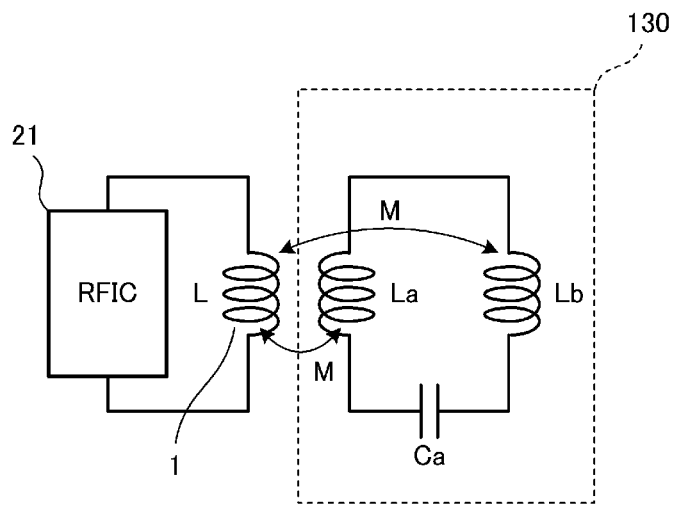

FIG. 15A and FIG. 15B are equivalent circuit diagrams illustrating circuits constituted by the booster antenna 130 and the coil antenna 1. Although the coil antenna 1 is actually defined by the first coil and the second coil, the coil antenna 1 is illustrated as a single coil here for the sake of simplicity. In FIG. 15A, inductors La and Lb indicate the inductances of the coil conductors 131A and 131B illustrated in FIG. 14 as symbols, whereas capacitors Ca and Cb indicate capacitances produced between both ends of the coil conductors 131A and 131B (these may be defined by capacitance elements, or may be stray capacitances arising at opposing portions of the coil conductors 131A and 131B). The inductors La and Lb and the capacitors Ca and Cb define an LC resonance circuit. Coupling between an inductor L of the coil antenna 1 and the inductors La and Lb is indicated by the letter M. Note that the configuration may such that one end of the coil conductors 131A and 131B is directly connected by a via conductor or the like, as indicated in FIG. 15B.

Of the preferred embodiments described thus far, the examples of FIGS. 6A and 6B and FIG. 8 illustrate defining a balanced circuit by providing the capacitances C3 and C4 in order to produce capacitive coupling between the first resonance circuit and the second resonance circuit; however, it should be noted that the two resonance circuits may be coupled in an unbalanced manner by providing only the one capacitance C3. In this case, the location where the capacitance C4 is originally provided may be open or shorted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An antenna device comprising:
a multilayer body;
a first coil and a second coil whose winding axes are parallel or substantially parallel and that magnetically couple with each other;
a first capacitance that is connected in parallel to the first coil and defines a first resonance circuit with the first coil;
a second capacitance that is connected in parallel to the second coil and defines a second resonance circuit with the second coil;
a third capacitance connected between at least one set of ends of the first coil and the second coil; and
a first power supply terminal connected to the first coil; wherein
the winding axes of the first coil and the second coil are oriented in a direction perpendicular or substantially perpendicular to a lamination direction of the multilayer body.
2. The antenna device according to claim 1, wherein
the multilayer body includes a plurality of base material layers including a magnetic material layer; and
the first coil and the second coil are provided in or on the multilayer body and are wound so that the magnetic material layer is positioned within the first coil and the second coil.
3. The antenna device according to claim 2, wherein the first coil and the second coil include conductor patterns along a surface perpendicular or substantially perpendicular to the lamination direction of the multilayer body, and are wound in a double helix shape, with each helix having a same diameter or substantially the same diameter so that the winding axes are oriented in the direction perpendicular or substantially perpendicular to the lamination direction of the multilayer body and the magnetic material layer is positioned within the helixes.
4. The antenna device according to claim 2, wherein a chip component including at least one of the first capacitance, the second capacitance, and the third capacitance is mounted on an upper surface of the multilayer body.
5. The antenna device according to claim 1, wherein the first coil and the second coil are connected so that the one end of the second coil is at a higher potential than another end of the second coil when a current flows from the one end of the first coil.
6. The antenna device according to claim 1, further comprising:
a second power supply terminal connected to the second coil; wherein
return loss characteristics as viewed from the first power supply terminal are different from return loss characteristics as viewed from the second power supply terminal.

7. The antenna device according to claim 1, further comprising a planar conductor that is disposed nearby the first coil and the second coil and that produces an electromagnetic field by electromagnetically coupling with the first coil and the second coil.

8. The antenna device according to claim 1, further comprising a coil conductor having a larger coil opening than the first coil and the second coil, that is disposed nearby the first coil and the second coil and that produces an electromagnetic field by electromagnetically coupling with the first coil and the second coil.

9. The antenna device according to claim 1, wherein
the multilayer body includes a plurality of base material layers including a magnetic material layer; and
the antenna device further comprises:
an insulative base material layer laminated to a top surface of one of the plurality of base material layers; and
a plurality of chip components are mounted on a surface of the insulative base material layer.

10. The antenna device according to claim 1, wherein
the multilayer body includes a plurality of base material layers including a magnetic material layer; and
the antenna device further comprises:
an upper conductor provided on provided on an upper one of the plurality of base material layers;
a lower conductor provided on provided on a lower one of the plurality of base material layers; and
an interlayer connecting conductor connecting the upper conductor and the lower conductor.

11. The antenna device according to claim 10, wherein the upper conductor, the lower conductor, and the interlayer connecting conductor define the first coil.

12. The antenna device according to claim 1, wherein the first coil and the second coil define a coil antenna, and an RFIC chip and a chip capacitor are mounted on a surface of the coil antenna.

13. The antenna device according to claim 1, wherein the first coil and the second coil define a coil antenna, and a plurality of chip components are mounted on a surface of the coil antenna.

14. The antenna device according to claim 13, further comprising a sealing resin arranged to seal an area of the coil antenna where the plurality of chip components are mounted on the surface of the coil antenna.

15. The antenna device according to claim 1, wherein the first coil and the second coil overlap each other across an entire area in which the first coil and the second coil are provided.

16. The antenna device according to claim 1, wherein the first coil and the second coil only partially overlap each other across an entire area in which the first coil and the second coil are provided.

17. The antenna device according to claim 1, further comprising a base member and a planar conductor provided on the base member.

18. The antenna device according to claim 17, wherein the base member is a printed circuit board.

19. A wireless communication device comprising:
the antenna device according to claim 1; and
a housing that contains the antenna device therewithin.

* * * * *